(12) United States Patent
Salonen

(10) Patent No.: US 9,461,951 B2
(45) Date of Patent: Oct. 4, 2016

(54) COMMUNICATION METHOD AND SYSTEM

(75) Inventor: Jukka Salonen, Luhtajoki (FI)

(73) Assignee: BOOKIT OY AJANVARAUSPALVELU, Helsinki (FI)

( * ) Notice: Subject to any disclaimer, the term of this patent is extended or adjusted under 35 U.S.C. 154(b) by 0 days.

(21) Appl. No.: 12/958,870

(22) Filed: Dec. 2, 2010

(65) Prior Publication Data
US 2011/0112965 A1     May 12, 2011

Related U.S. Application Data

(63) Continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429.

(30) Foreign Application Priority Data

Aug. 21, 2001 (FI) .................................... 20011680

(51) Int. Cl.
*G06Q 20/40* (2012.01)
*H04L 12/58* (2006.01)
(Continued)

(52) U.S. Cl.
CPC .............. *H04L 51/18* (2013.01); *G06Q 10/02* (2013.01); *G06Q 10/025* (2013.01); *G06Q 10/109* (2013.01); *G06Q 10/1095* (2013.01); *G06Q 20/322* (2013.01); *G06Q 20/3221* (2013.01); *G06Q 20/40* (2013.01); *G06Q 30/0267* (2013.01); *G06Q 30/0601* (2013.01); *G06Q 30/0609* (2013.01); *G06Q 30/0623* (2013.01); *G06Q 50/14* (2013.01);
(Continued)

(58) Field of Classification Search
CPC ....................................................... G06Q 20/40
USPC ............................................................ 705/44
See application file for complete search history.

(56) References Cited

U.S. PATENT DOCUMENTS 5,592,666 A     1/1997  Perez
5,838,965 A    11/1998  Kavanagh et al.
(Continued)

FOREIGN PATENT DOCUMENTS

CN     1675637 A    9/2005
EP     0881802 A1   2/1998
(Continued)

OTHER PUBLICATIONS bmd wirless, "Leading the Way to Enable Cross Network SMS Applications with the Wireless Application Messaging Server", Wireless Application Messaging Server, 2004.
(Continued)

*Primary Examiner* — Lindsay M Maguire
(74) *Attorney, Agent, or Firm* — Barnes & Thornburg LLP

(57) ABSTRACT

A method and system authenticate a transaction between a user and a payment system. The information of the transaction is transmitted through a secure communications from the user to the payment system, and the authentication message is sent from a payment system to the user via an authentication system. The authentication message is sent from the authentication system from one of multiplicity of addresses to the user, and the response to the message is received in that address. Additional security is achieved when the reply addresses are selected randomly.

17 Claims, 8 Drawing Sheets

(51) Int. Cl.

| | | |
|---|---|---|
| *G06Q 10/02* | (2012.01) | |
| *G06Q 10/10* | (2012.01) | |
| *H04M 3/42* | (2006.01) | |
| *H04L 29/12* | (2006.01) | |
| *G06Q 30/06* | (2012.01) | |
| *G06Q 20/32* | (2012.01) | |
| *H04W 4/12* | (2009.01) | |
| *H04W 12/06* | (2009.01) | |
| *H04L 29/08* | (2006.01) | |
| *H04L 29/06* | (2006.01) | |
| *G06Q 30/02* | (2012.01) | |
| *H04W 4/14* | (2009.01) | |
| *G06Q 50/14* | (2012.01) | |
| *G08G 1/00* | (2006.01) | |

(52) U.S. Cl.
CPC ........ *H04L 29/12726* (2013.01); *H04L 67/10* (2013.01); *H04L 67/42* (2013.01); *H04M 3/42382* (2013.01); *H04W 4/12* (2013.01); *H04W 4/14* (2013.01); *H04W 12/06* (2013.01); *G08G 1/207* (2013.01)

(56) References Cited

U.S. PATENT DOCUMENTS

| | | | |
|---|---|---|---|
| 5,940,818 | A | 8/1999 | Malloy et al. |
| 5,987,467 | A | 11/1999 | Ross et al. |
| 6,003,036 | A | 12/1999 | Martin |
| 6,085,100 | A | 7/2000 | Tarnanen |
| 6,104,870 | A * | 8/2000 | Frick et al. ............ 703/27 |
| 6,199,076 | B1 | 3/2001 | Logan et al. |
| 6,539,360 | B1 | 3/2003 | Kadaba |
| 6,560,456 | B1 | 5/2003 | Lohtia et al. |
| 6,564,261 | B1 | 5/2003 | Gudjonsson et al. |
| 6,639,919 | B2 | 10/2003 | Kroninger et al. |
| 6,772,336 | B1 | 8/2004 | Dixon, Jr. |
| 6,990,332 | B2 | 1/2006 | Vihinen |
| 7,149,537 | B1 | 12/2006 | Kupsh et al. |
| 7,154,060 | B2 | 12/2006 | Rosenbaum et al. |
| 7,222,081 | B1 | 5/2007 | Sone |
| 7,406,429 | B2 | 7/2008 | Salonen |
| 7,451,118 | B2 * | 11/2008 | McMeen et al. ............ 705/401 |
| 7,610,208 | B2 | 10/2009 | Salonen |
| 7,610,224 | B2 | 10/2009 | Spiegel |
| 7,619,584 | B2 | 11/2009 | Wolf |
| 7,660,397 | B2 | 2/2010 | Heen et al. |
| 8,050,664 | B2 * | 11/2011 | Salonen ............ 455/417 |
| 2001/0037264 | A1 | 11/2001 | Husemann et al. |
| 2001/0049785 | A1 | 12/2001 | Kawan et al. |
| 2002/0028686 | A1 | 3/2002 | Kagi |
| 2002/0032589 | A1 | 3/2002 | Shah |
| 2002/0059146 | A1 | 5/2002 | Keech |
| 2002/0080822 | A1 | 6/2002 | Brown et al. |
| 2002/0104007 | A1 | 8/2002 | Moodie et al. |
| 2002/0111914 | A1 | 8/2002 | Terada et al. |
| 2002/0165000 | A1 | 11/2002 | Fok |
| 2002/0173319 | A1 | 11/2002 | Fostick |
| 2002/0180696 | A1 | 12/2002 | Maritzen et al. |
| 2002/0184509 | A1 | 12/2002 | Scheidt et al. |
| 2002/0188562 | A1 * | 12/2002 | Igarashi et al. ............ 705/40 |
| 2002/0191795 | A1 | 12/2002 | Wills |
| 2003/0005126 | A1 | 1/2003 | Schwartz et al. |
| 2003/0101071 | A1 | 5/2003 | Salonen |
| 2003/0163536 | A1 | 8/2003 | Pettine, Jr. |
| 2003/0211844 | A1 | 11/2003 | Omori |
| 2004/0128158 | A1 | 7/2004 | Salonen |
| 2004/0128173 | A1 | 7/2004 | Salonen |
| 2004/0139318 | A1 | 7/2004 | Fiala et al. |
| 2004/0157628 | A1 | 8/2004 | Daniel et al. |
| 2004/0185883 | A1 | 9/2004 | Rukman |
| 2004/0198322 | A1 | 10/2004 | Mercer |
| 2005/0027608 | A1 | 2/2005 | Wiesmuller et al. |
| 2005/0054286 | A1 | 3/2005 | Kanjilal et al. |
| 2005/0065995 | A1 | 3/2005 | Milstein et al. |
| 2005/0102230 | A1 * | 5/2005 | Haidar ............ 705/40 |
| 2005/0171738 | A1 | 8/2005 | Kadaba |
| 2005/0246209 | A1 | 11/2005 | Salonen |
| 2005/0268107 | A1 | 12/2005 | Harris et al. |
| 2006/0010085 | A1 * | 1/2006 | McMeen et al. ............ 705/410 |
| 2006/0040682 | A1 | 2/2006 | Goertz et al. |
| 2006/0075139 | A1 | 4/2006 | Jungck |
| 2006/0131385 | A1 | 6/2006 | Kim |
| 2006/0224407 | A1 * | 10/2006 | Mills ............ 705/1 |
| 2006/0271551 | A1 | 11/2006 | Suojasto |
| 2007/0010266 | A1 | 1/2007 | Chaudhuri |
| 2007/0047533 | A1 | 3/2007 | Criddle et al. |
| 2007/0135101 | A1 | 6/2007 | Ramati et al. |
| 2007/0143230 | A1 | 6/2007 | Narainsamy et al. |
| 2008/0147408 | A1 | 6/2008 | Da Palma et al. |
| 2008/0317224 | A1 | 12/2008 | Salonen |
| 2009/0281929 | A1 | 11/2009 | Boitet et al. |

FOREIGN PATENT DOCUMENTS

| | | |
|---|---|---|
| EP | 0 967 754 A2 | 12/1999 |
| EP | 1 065 899 A1 | 1/2001 |
| EP | 1546938 | 8/2002 |
| EP | 1 458 201 A1 | 9/2004 |
| FI | 20011680 A | 2/2003 |
| FI | 117663 B | 12/2006 |
| FI | 20060387 A1 | 10/2007 |
| FI | 118586 B | 12/2007 |
| GB | 2391646 A | 6/2002 |
| GB | 2435565 A | 8/2007 |
| KR | 20040013261 A | 2/2004 |
| WO | WO 97/06603 A2 | 2/1997 |
| WO | WO 00/41102 A2 | 7/2000 |
| WO | WO 00/52601 A1 | 9/2000 |
| WO | WO 01/39033 A1 | 5/2001 |
| WO | WO 01/53991 A1 | 7/2001 |
| WO | 02067602 A1 | 8/2002 |
| WO | WO 2004/019223 A1 | 3/2004 |
| WO | 2006122399 A1 | 11/2006 |
| WO | WO 2007/063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Elisa Plc's press release, "Bookit Ltd and Elisa Implement a Handy Mobile Phone-Enabled Check-in Service for Finnair", www.elisa.fi, Sep. 6, 2004.

Elisa Plc's press release, "Innovative Solution Receives 2004 European Good Practise Award in Oppupational Health and Safety" and the appendix: BookIT case.pdf, Nov. 22, 2004.

Empower Interactive Group Ltd., "Virtual Mobile Redirector", Product Information Document, 2001.

Finnair Plc's press release, "Finnair to Introduce the Workld's easiest check-in—with Text Message", www.bookit.net/news/, Sep. 6, 2004.

Jyrki Penttinen, "GSM-tekniikka, WSOY", Porvoo, pp. 25, 155-157, 222 & 331-332, 1999.

Kauppalehti, "Mobiilipalvelujen oltava yksinkertaisia:", BookIT:n Jukka Salonen uskoo tavallisiin tekstiviesteihin, Heikki Nenonen, p. 19, publ. Sep. 6, 2005.

Mobileway Lauches its Mobile Transaction Tracker Solution, Press Release from Mobileway Corp., Jul. 11, 2002.

Mouly et al., "The GSM System for Mobile Communications", Palaiseau, pp. 556-560, 1992.

Sonera, Content Gateway Version 4.0 Deployment and Billing Manual, Version 1.0, Jan. 1, 2005.

Verkkouutiset, Sonera tarjoaa matkaviestinoperaattoreille Content Gateway-palvelualustaa, www.verkkouutiset.fi, Feb. 21, 2001.

Finnish Search Report May 4, 2006.

Finnish Search Report Jun. 3, 2009.

* cited by examiner

COMMUNICATION METHOD AND SYSTEM

This application is a Continuation-in-part of U.S. application Ser. No. 11/980,470, filed Oct. 31, 2007, which is a Continuation of U.S. application Ser. No. 10/227,194, filed Aug. 21, 2002, now U.S. Pat. No. 7,406,429, and for which priority is claimed under 35 U.S.C. §120; and this application claims priority of Application No. 20011680 filed in Finland on Aug. 21, 2001 under 35 U.S.C §119; the entire contents of all are hereby incorporated by reference.

FIELD OF THE INVENTION

The present invention relates to telecommunications. In particular, the invention relates to a method and system for authenticating a user to an entity.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

There are many methods to exchange information between services. Speaking of services that include booking or calendar functions, information exchange often takes place as synchronizing booking or calendar entries. For that purpose, several important standardization efforts are going on. For example, SyncML is an industry initiative to develop and promote a single, common data synchronization protocol. vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

As these examples show, there have been lots of efforts to build systems that can synchronize booking systems. A common problem with all of these existing solutions is that they do not provide common semantics for different systems. For example, if an entry is tentative, different systems may interpret it in different ways.

Another problem is that booking systems have multiple different and usually quite complex user interfaces. If a customer wants to both make an appointment with a dentist and book a taxi to take him or her there, the customer needs to enter all the booking information to both booking systems in different ways.

One more problem is that it becomes challenging to manage client replies, if a client has been given a number of questions. For example, it makes sense to use SMS text messages to ask client which option he or she chooses, because in many countries, like in Finland, it is very common to communicate with SMS text messages and they create revenues to operators. However, if a client replies to several inquires by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

SUMMARY OF THE INVENTION

It is an object of the present invention to provide a method and system for communicating over a telecommunications network in which an entity has access to multiple distinct addresses.

It is an aspect of certain embodiments of the invention to provide a method and system capable of making booking type transactions involving at least one service provider and a plurality of users who are each communicating with a mobile telephone capable of receiving and sending short text messages and/or emails.

It is further an aspect of certain embodiments of the invention to provide a method and system capable of making booking type transactions between a plurality of service providers and a plurality of users who are each communicating with a mobile telephone capable of receiving and sending short text messages and/or emails.

It is yet a further aspect of certain embodiments of the invention to provide a method and system capable of authenticating a user to transaction provider.

BRIEF DESCRIPTION OF THE DRAWINGS

In the following section, the invention will be described in detail by the aid of a few examples of its embodiments, in which.

DESCRIPTION OF THE INVENTION

Figure 1:
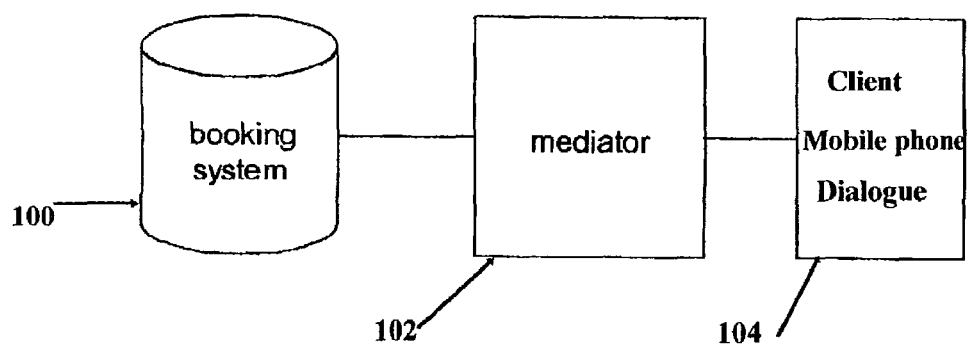
FIG. 1 represents one advantageous system in accordance with the invention.

The invention relates to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

The booking system in accordance with the invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and a well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a clients need, for example coordination of an airline booking with transportation to the airport.

FIG. 1 is a diagram of the simplest system comprising a single service provider booking system 100 for a single service provider, a mediator 102 communicating with the service provider over a network, and a user with a mobile phone having a dialogue entered thereon.

Figure 2:
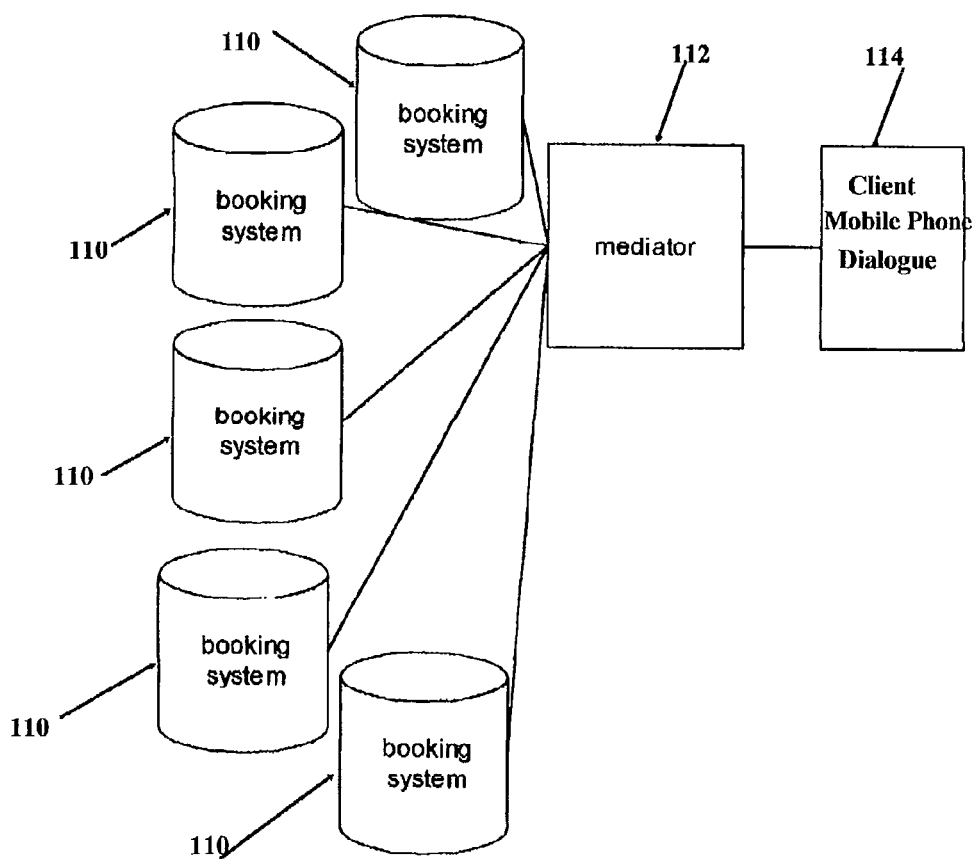
FIG. 2 represents a second advantageous system in accordance with the invention.

FIG. 2 shows a plurality of service provider booking systems communicating with a mediator over a network.

Figure 3:
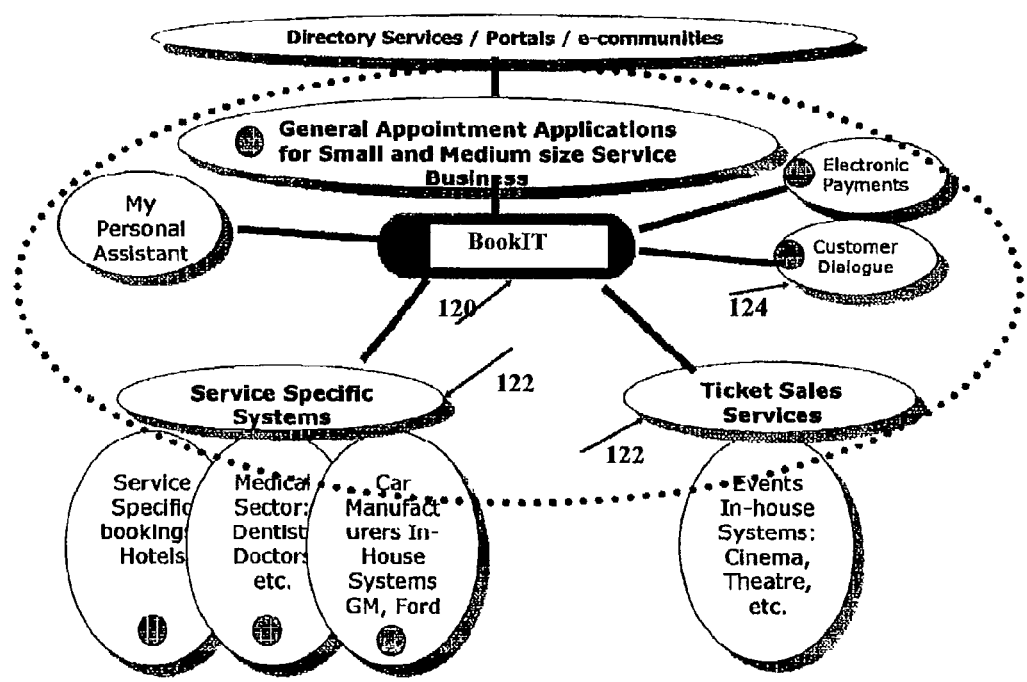
FIG. 3 represents a third advantageous system in accordance with the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:

1. There is a predetermined set of dialogues in the system. Their content and the possible choices are set in advance. For example, if a client books a flight, a dialogue always offers certain other bookings. Client's prior actions are not taken into consideration.
2. There is an unlimited number of dynamic or "intelligent" dialogues that are based on, for instance, a profile that a client has created himself or herself, usage history records, and client's location. Simple logic supports decisions. It is a low-level expert system.
3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
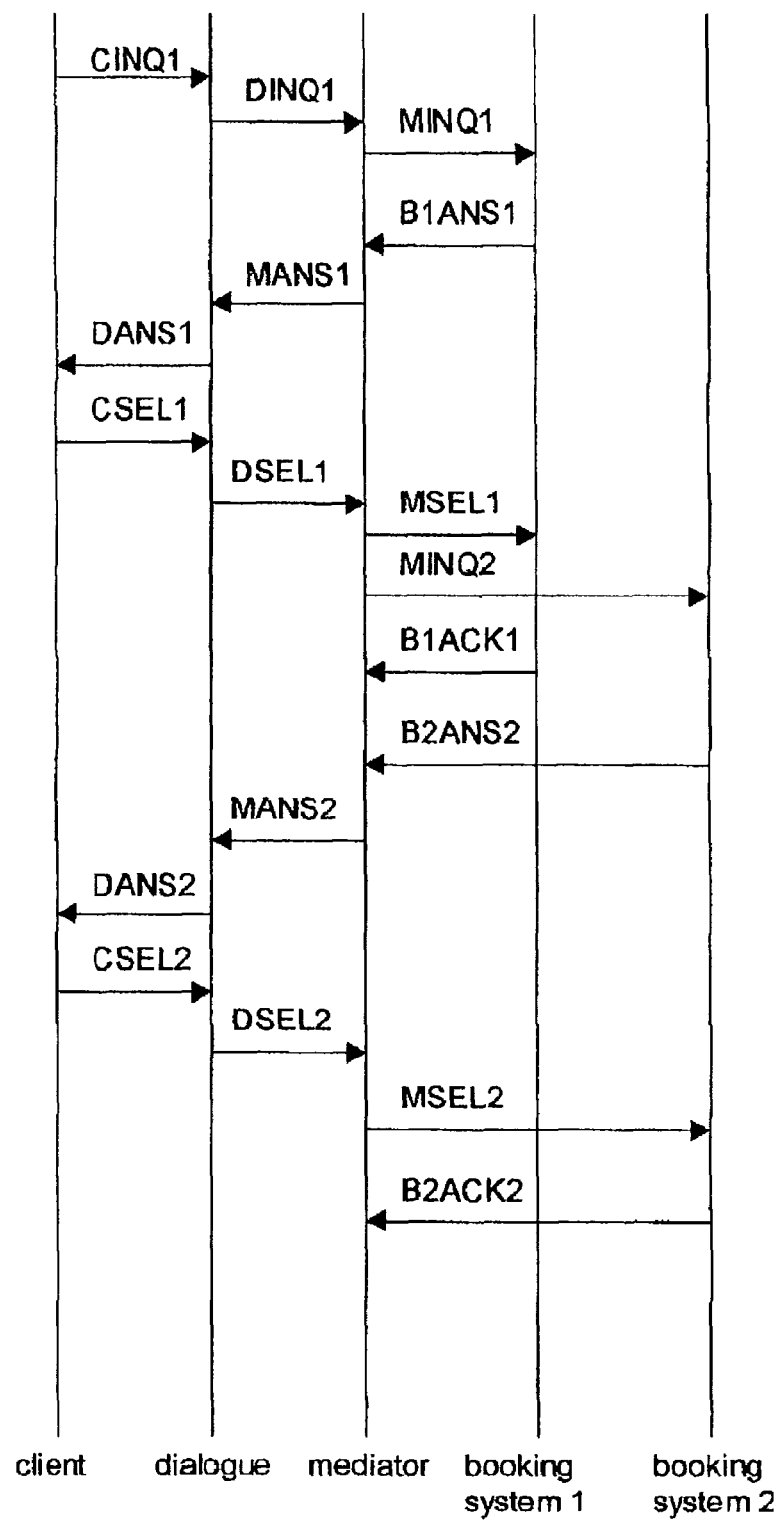
FIG. 4 is one advantageous example of a sequence diagram representing messages transmitted within a system in accordance with the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
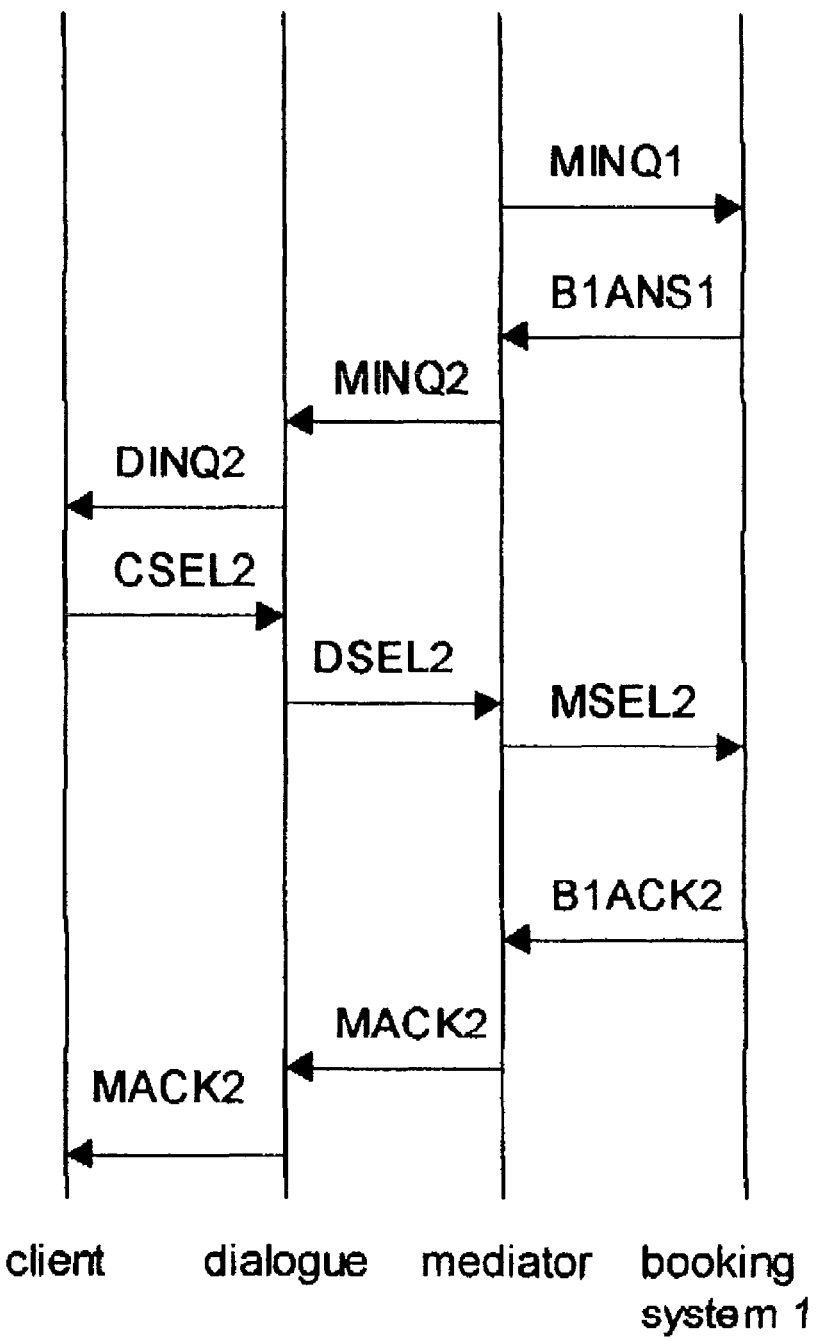
FIG. 5 is a second advantageous example of a sequence diagram representing messages transmitted within a system in accordance with the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQ1, was initiated by the mediator.

Example 1

A Preferred Booking System

A preferred booking system according to the invention is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a suggested start-time (ISO time-stamp w/time zone)
b suggested start-location (coordinates)
c suggested end-time (ISO time-stamp w/time zone)
d suggested end-location (coordinates)

4. Confirming

Time and location as it is accepted by the resources that have accepted. Data related to this phase:
a accepted start-time (ISO time-stamp w/time zone)
b accepted start-location (coordinates)
c accepted end-time (ISO time-stamp w/time zone)
d accepted end-location (coordinates)

By default the data is copied from the Planning phase.

In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a actual start-time (ISO time-stamp w/time zone)
b actual start-location (coordinates)
c actual end-time (ISO time-stamp w/time zone)
d actual end-location (coordinates)
e products used, extras, mileage, . . .

By default the data is copied from the Confirming phase.

6. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| Phase/Data | Identifying | Resources | Suggested time | Accepted time | Task's work related | Accounting | Closing |
|---|---|---|---|---|---|---|---|
| Filing | X | | | | | X | |
| Requesting | X | X | | | | X | |
| Scheduling | X | X | X | | | X | |
| Confirming | X | X | X | X | | X | |
| Working | X | X | X | X | X | X | |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re Scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 7:
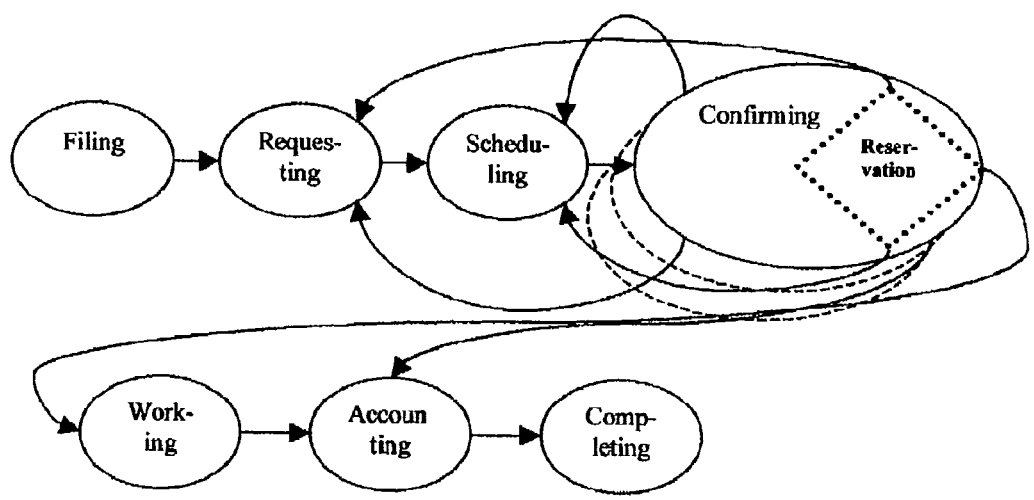
FIG. 7 shows the phases of the booking process in a preferred embodiment of the invention.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are:
a "NoReplies" (0) for "No-one hasn't replied to the request made by the organizer"
b "NoDeclines" (1) for "Not all invitees have replied yet. The ones who have replied have accepted"
c "AllAccepts" (2) for "all invitees have confirmed"
d "SomeDeclines" (3) for "Some of the invitees have declined"
e "AllDeclines" (4) for "All of the invitees have declined".

The following decision table helps in evaluating the status of the whole booking. "Maybe" means that this condition only does not incontestably specify true or false result.

| Booking Status | Confirmations | | | | | | |
|---|---|---|---|---|---|---|---|
| | No one answered | No one accepted | Some accepted | All accepted | No one declined | Some declined | All declined |
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

Figure 6:
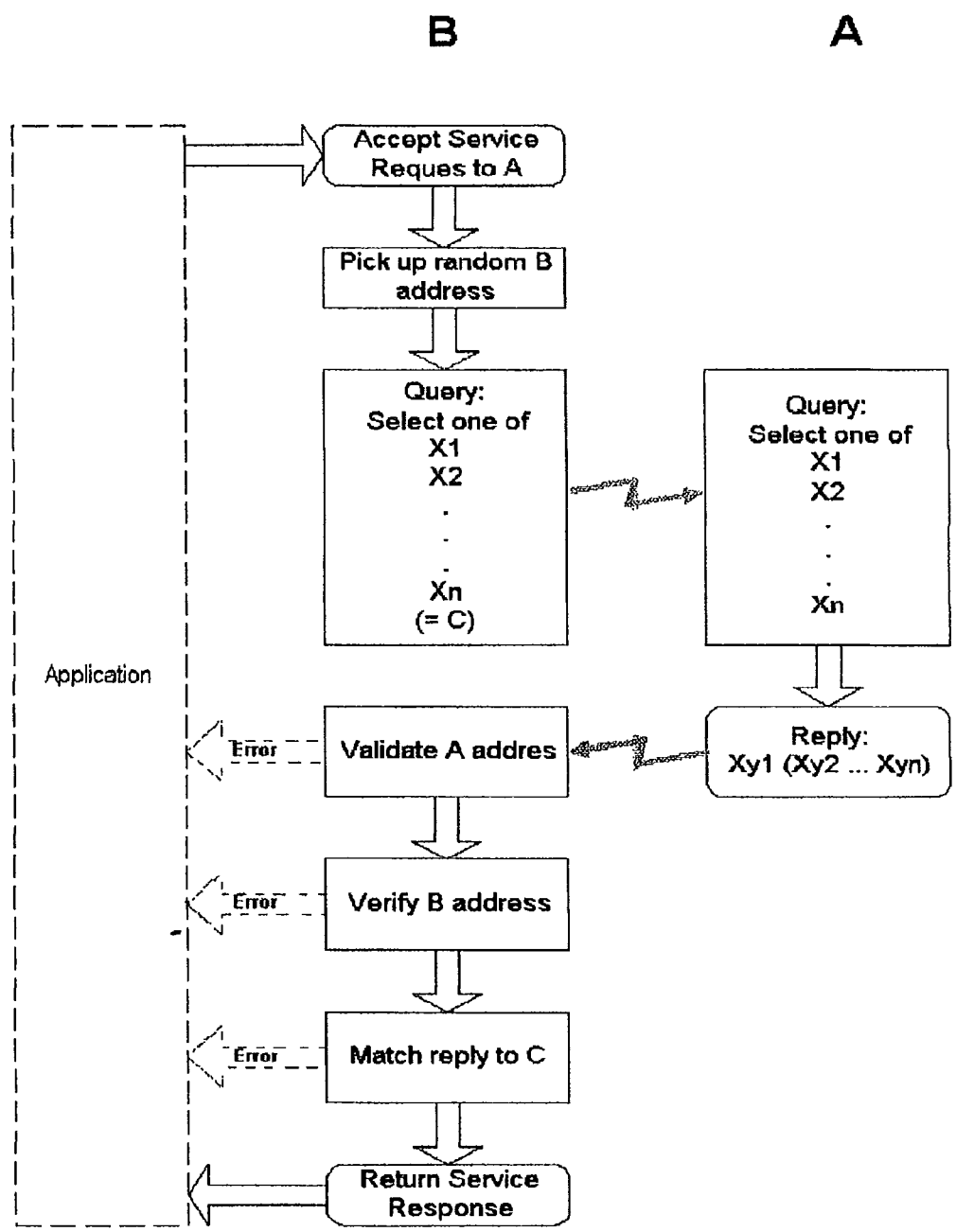
FIG. 6 shows an example of the dynamic dialog matrix applied to a query and reply according to the invention.

FIG. 6 shows an example of the dynamic dialog matrix applied to a query and reply according to the invention. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in his/her terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to A address whereto the mediator B has sent a query to, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

Preferably, the system with reference to FIG. 6 has a plurality B subscriber numbers (telephone numbers), wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B is sent over the telecommunication network.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 8.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

Example 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:
Please choose one of the following departure times:
6:00 a.m., answer A
7:30 am., answer B
8:15 a.m., answer C.
If none of these is OK, answer D.
Sender: +358440844 027
Please choose ticket class:
First class, answer A
Business class, answer B
Economy class, answer C
Cheapest available, answer D
Sender: +358440844 011
Please choose:
Window seat, answer A
Aisle seat, answer C
Sender: +358440844 034
Please select the meal:
Vegetarian, answer A
Beef answer B
Chicken, answer C
Sender: +358440844 003
The answers received from the customer to the preceding questions and several others were
'A' to question with ref. no+358 440 844 027
'D' to question with ref. no+358 440 844 011
'A' to question with ref. no+358 440 844 034
'B' to question with ref. no+358 440 844 003
'D' to question with ref. no+358 440 859 751
'A' to question with ref. no+358 440 844 277
'C' to question with ref. no+358 440 841 368
From this, the service provider can find out that the customer chose:
the first morning flight (=A),
cheapest available ticket (=D),
window seat (=A),
beef for meal (=B),
and etc.

It is important to note with the matrix the customer can answer the questions in any order, and can even fail to answer some questions. If these are relevant, the system can urge for an answer. If not, the system can proceed without this information.

Figure 8:
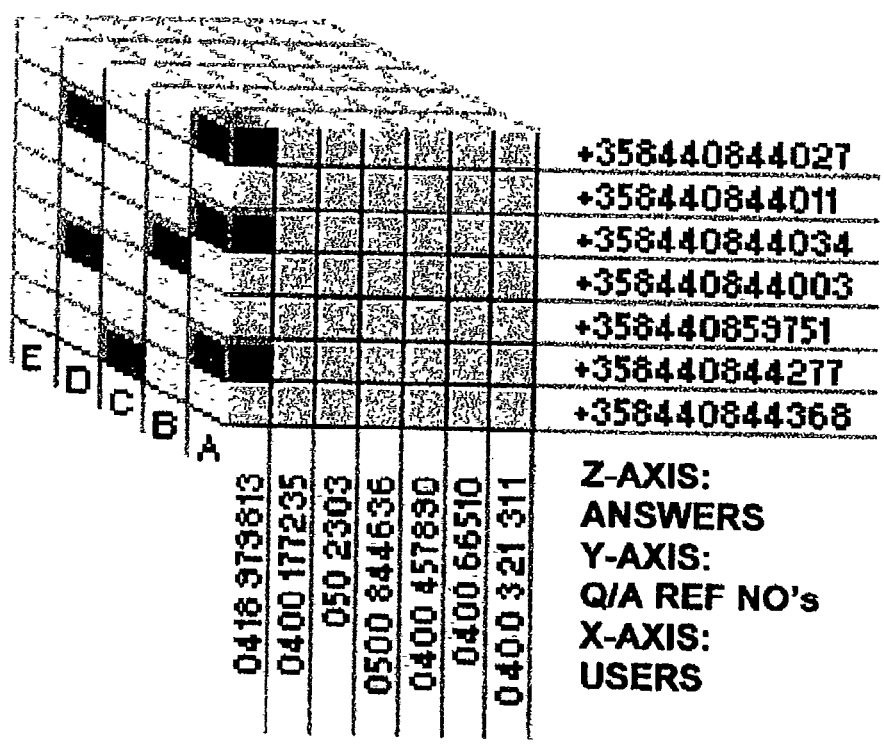
FIG. 8 shows a matrix diagram corresponding to Example 2, according to a preferred embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

In one preferred embodiment of the present invention, there is provided a method and a system for authenticating (or confirming) a credit card or other payment. In this embodiment of the present invention, there is four entities involved in the payment: 1) a client (or a user) who buys something; 2) a seller, to whom the payment is made; 3) payment system, wherefrom the payment is provided between the user and the seller; 4) a mediator or a service provider or a confirmation system, that provides the authentication or confirmation of the payment. The user preferably makes the payment to the seller through a credit card. The user further has preferably a mobile terminal through which he/she can confirm the payment.

The purchase is made between the client and the seller. Usually payment is made between the seller and the payment system on the basis of information regarding the user (e.g. on the basis of the credit card number). The communication of payment between the seller and the payment system is utilized through a secure communications. E.g., when a credit card payment is made, the user inserts a credit card to a seller's credit card reader. The reader reads the information from the credit card and provides the information to the credit card company (payment system) for authentication/confirmation purposes. The information is provided from the credit card reader to the credit card company through secure communication line (or other secure manner currently used). In prior art, the credit card company provides authentication for payment back to the seller's credit card reader. This is, however, vulnerable for frauds, when the credit card has been stolen from the real user, especially when making payments in the Internet.

In one preferred embodiment of the present invention, there is provided an improved system for making payments through credit card or banking system. In this embodiment, when the information regarding the payment is received in the credit card company, the credit card company makes a request for confirmation to a confirmation system. The confirmation system may be a server in a communications network, and the communication between the credit card company and the confirmation system may be utilized through a secure communications connection. The confirmation system creates a message (preferably an SMS message) to the user. The confirmation system has several reply addresses in which it can receive responses from the user. When mobile communications system is used to confirm a payment, the reply addresses may by mobile telephone numbers. The confirmation system associates one of the several reply addresses to the message, and sends the message to the user. To increase the security of the payment confirmation, the confirmation system selects the reply number in random.

After receiving the confirmation message in the mobile telephone, the user may confirm the payment simply by responding to the confirmation message. The response is received in the confirmation system. The message is processed in the confirmation system in order to find out whether the message is received from the correct mobile telephone number (the user's mobile phone number) into correct reply address (the same telephone number from which the confirmation message was sent from the confirmation system) and what the response was. In case the reply was received from the correct user's address into correct reply address, the confirmation system sends information regarding the user's reply to the credit card company. Thereafter, the credit card company may confirm the payment to the seller, and the payment transaction is provided between the user and the seller.

The communication between the user and the confirmation system may be considered secure connection, since the user does not know whereto the confirmation message needs to be sent, before receiving the message into the mobile terminal. Therefore, if the credit card is stolen from the user, the fraudulent use of the credit card may be prohibited by not authenticating the payment if the confirmation message is not received from the user to the confirmation system. The level of security between the user and the confirmation system may be changed on the basis of the number of possible reply addresses that are used by the confirmation system. Also the level of security may be increased if more than one messages is sent from the confirmation system to the user and using above described semantic analysis.

The above embodiments enhances security of payments, since in addition to the transaction information based on the credit card number or alike information, the user needs to approve the transaction. In case the credit card is stolen, the user is informed of fraudulent use of the credit card and can deny the transaction.

The above system may also be applied to transactions through a banking system. When a user has a direct payment (or some other) arrangement with the bank, his/her payments are automatically paid from his/her account on a certain date. After an invoice is received on the banking system, the bank may want to check if the invoice is something that the user wants to pay (or the bank may also want a confirmation from a user for an irregular invoice). The banking system sends a confirmation request to the confirmation system requesting a confirmation to the payment from the user. The confirmation system prepares a message (e.g., an SMS message) and allocates a reply number to the message. The number may be allocated from a pool of reply numbers that are available for the user. The confirmation system sends the message to the user's mobile telephone. When the user receives the message he/she can reply to the message by sending confirmation message back to the confirmation system (to the number wherefrom the message was received). When receiving the message in the confirmation system, the confirmation system evaluates whether the reply was received from the correct number (user's number) into correct number (the number in the confirmation system whereto the reply was expected) and what the message was. In case the user confirmed the payment, the confirmation system notifies the banking system that the confirmation was received, and the banking system may process the payment transaction (whether immediately or at certain time). If the confirmation system did not receive a reply from the user or the reply was incorrect, the confirmation system informs the banking system that no confirmation was received and the banking system does not process the transaction.

Another embodiment of the present invention covers a solution in which a user wishes to make a payment with the aid of user's mobile telephone. The user sends a text message from his/her mobile telephone into a certain number (indicating certain transaction). When the seller's system receives the request from the user, it may request information of which bank account/credit card/other payment system the user wishes to use for the transaction. If the user wishes to make the payment through a banking system, he/she may indicate in which bank he/she has an account from which the transaction is to be made. When the seller's system receives the reply from the user, it may provide the information of which user and the information of the transaction to the banking system. In case the user has only one account in that bank, the banking system sends a request for confirmation to the confirmation system, which prepares and sends a text message to the user. When the user confirms/ authenticates the transaction by sending a reply to the confirmation system, the confirmation system authenticates the message, as described with reference to the preferred embodiment, and sends information of the payment confirmation to the banking system. The banking system then performs the transaction and provides information of the completed transaction to the seller's system. Thereafter, the seller's system may provide the user the purchased product/service. If the user has several accounts, the banking system may first request through a confirmation system information from which account the user wishes to make the transaction. When using different reply addresses (numbers) for different messages to the user, the security of the transaction is increased. The above method and system may also be applied if the user has several credit cards or other payment systems. If the user has multiple credit cards, the message requesting which credit card is used for the purchase may indicate e.g., only four last digits of the credit card number, in order to increase the security (i.e., no one would get the information of the user's credit card numbers if the message would be find out someone else than the credit card owner, e.g., through a theft of a mobile phone).

Alternatively, the seller's system may request from certain banks and/or credit card companies if the user has an account in that bank or a credit card, and provide these choices to the user, where he/she can pick up the transaction method.

In the above embodiments, the account and/or credit card information is only provided through a secure communications network and the confirmation requests or alike do not indicate the confidential information (e.g., account or credit card number).

Although the present invention has been described in considerable detail with reference to certain preferred versions thereof, other versions are possible. Therefore the spirit and scope of the appended claims should not be limited to the preferred versions herein.

The invention claimed is:

1. An online authentication system for online authentication of a transaction between a mobile phone, associated with a user and a payment system, via communication messages between the mobile phone and the payment system, wherein the authentication system comprises:
   a telecommunications network connection to a payment system;
   a multiplicity of reply addresses at which the online authentication system is capable of receiving reply communication messages from one or more mobile phones including the mobile phone;
   at least one processor and authentication software running on the at least one processor to cause the at least one processor to:
      prepare a transaction authentication communication message for the transaction to be sent to the mobile phone over at least one telecommunication network,
      randomly select a reply address from the multiplicity of reply addresses and associate the randomly selected reply address as a reply address for the transaction authentication communication message,
      send the transaction authentication communication message, including the randomly selected reply address, to the mobile phone over the at least one telecommunication network,
      receive a reply communication message from the mobile phone over the at least one telecommunication network at the randomly selected reply address, the reply communication message having a sender address that is the user's subscriber number, Calling Line Identity (CLI), e-mail address or IP address associated with the mobile phone, and
      authenticate the transaction based on contents of the reply communication message, the sender address and the randomly selected reply address at which the reply communication message from the mobile phone is received by the online authentication system.

2. The online authentication system of claim 1, wherein the logic and resources are configured to send information indicating that the user authenticated the transaction from the online authentication system to the payment system following authentication of the transaction.

3. The online authentication system of claim 1, wherein the at least one telecommunication network is a mobile communications network.

4. The online authentication system of claim 1, wherein the transaction authentication is also based on semantics of the reply communication.

5. The online authentication system of claim 4, wherein the further analysis of the semantics of the reply communication message includes comparing content of the reply communication message with stored information about what kinds of reply content are acceptable.

6. The online authentication system of claim 5, wherein, if reply content does not meet criteria identified in the stored information, the reply communication message is rejected as not being an authentic reply communication message.

7. The online authentication system of claim 1, wherein the online authentication system tracks which of the multiplicity of reply addresses are currently available for use, and selects each particular randomly selected reply address from among the reply addresses which are currently available for use.

8. The online authentication system of claim 1, wherein the transaction is a payment request which is sent to the payment system from a seller's system to a credit card company's payment system or to a banking system.

9. The online authentication system of claim 1, wherein information that the user authenticated the transaction is transmitted from the online authentication system to the payment system via the telecommunications network connection following authentication of the transaction.

10. The online authentication system of claim 1, wherein the transaction authentication communication and reply communication messages are short messages.

11. The online authentication system of claim 1, wherein the transaction authentication communication and reply communication messages are SMS messages.

12. The online authentication system of claim 1, wherein the transaction authentication communication and reply communication messages are text messages.

13. The online authentication system of claim 1, wherein the transaction is associated with a booking event.

14. The online authentication system of claim 13, wherein the booking event pertains to a booking that is an allocation of a single resource to the user.

15. The online authentication system of claim 14, wherein the booking is for a service from a service provider.

16. The online authentication system of claim 13, wherein the dialogue is activated by transmission of a message to the mobile phone.

17. The online authentication system of claim 1, wherein the transaction authentication communication and reply communication messages are associated with a dialogue between the online authentication system and the mobile phone.

\* \* \* \* \*